(12) United States Patent
Reise

(10) Patent No.: US 6,301,192 B1
(45) Date of Patent: Oct. 9, 2001

(54) METHOD FOR GENERATING 2 AND 3-DIMENSIONAL FLUID MESHES FOR STRUCTURAL/ACOUSTIC FINITE ELEMENT ANALYSIS IN INFINITE MEDIUM

(75) Inventor: Christa M. Reise, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/632,002

(22) Filed: Aug. 7, 2000

(51) Int. Cl.⁷ .................................................. G06T 17/20

(52) U.S. Cl. ............................................. 367/11; 367/131

(58) Field of Search .................. 367/7, 11, 131; 703/2, 6, 9

(56) References Cited

U.S. PATENT DOCUMENTS

| 5,581,489 | * | 12/1996 | Groothuis et al. . |
| 5,664,064 | * | 9/1997 | Nakao et al. . |
| 5,729,670 | * | 3/1998 | Strumolo et al. . |
| 5,768,156 | * | 6/1998 | Tautges et al. . |
| 6,219,440 | * | 7/2001 | Schaff et al. ............................. 703/11 |

* cited by examiner

Primary Examiner—Daniel T. Pihulic
(74) Attorney, Agent, or Firm—Michael J. McGowan; Robert W. Gauthier; Prithvi C. Lall

(57) ABSTRACT

The present invention relates to a method for generating 2 and 3-dimensional fluid meshes for structural/acoustic finite element analysis in an infinite medium. The method broadly comprises the steps of: enclosing a structure to be analyzed in a block of fluid; determining a bias factor and coordinates for the mesh; and generating at least one of a two dimensional and a three dimensional mesh using the coordinates and the bias factor.

13 Claims, 4 Drawing Sheets

US 6,301,192 B1

METHOD FOR GENERATING 2 AND 3-DIMENSIONAL FLUID MESHES FOR STRUCTURAL/ACOUSTIC FINITE ELEMENT ANALYSIS IN INFINITE MEDIUM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention is a method for creating frequency dependent structural/acoustic meshes for three dimensional finite element problems in infinite or semi-infinite mediums. The method maps a three dimensional object to a rectilinear acoustic field that can easily be modified for changes in frequency.

(2) Description of the Prior Art

Finite element analysis of structures submerged in an infinite medium are used to determine the stresses acting on prototype undersea hardware. Simple two dimensional axisymetric models are often employed because three dimensional models are too large and cumbersome to create. The most difficult problems in creating meshes for conventional finite element solvers are: (1) the generation of a three dimensional mesh that can accommodate a range of frequency responses without overstepping the memory requirements of the computer; and (2) the creation of a mesh that can capture small details of a structure and also be transmitted to a larger size mesh suitable for low frequency evaluation.

Not all finite element software packages are capable of solving structural acoustic problems. Often preprocessors are used to create elements that can be imported into nonlinear solvers. The preprocessors become slow and inefficient when processing the large number of nodes to be used in a coupled fluid/structure infinite medium analysis. Also the input files they generate require editing before they can be imported into the solver. When the files get too large, they exceed the memory allotment of the editor on the computer. It is more efficient in these cases to generate meshes using the solver program mesh generator.

Finite element software requires that a structure in a free field be surrounded by one wavelength of acoustic medium on all sides. An absorption fluid impedance condition is then placed at the boundaries to prevent reflections in the medium that could affect the structure's response. Another requirement is that the acoustic element length be a minimum of one-sixth of a wavelength for a solution. Good finite element mesh construction dictates that mesh nodes of linear elements have maximum dimensional ratios of 3:1:1. It also dictates that the included angles on quadrilateral and brick elements be greater than 5 degrees and less than 135 degrees. Often a model is desired to be evaluated for a frequency range over 500 Hz for steady state operation. Using the above criteria, a mesh with one-eighth symmetry that could be used at a frequency of 500 Hz would have a maximum element length of 29.5 inches. If this mesh were also to be used at 10 Hz, the mesh would have to extend 5905 inches in three directions. This would result in a model with 7,919,529 elements. Solving a problem of this size at each frequency of interest becomes an expensive task.

SUMMARY OF THE INVENTION

Accordingly, it is an object of the present invention to provide a method for generating variable frequency rectilinear meshes in two and three dimensions.

It is a further object of the present invention to provide a method as above which can be implemented with any preprocessor software or solver software.

It is yet another object of the present invention to provide a method as above for generating the meshes more efficiently.

The method of the present invention attains the foregoing objects.

In accordance with the present invention, a method for efficiently generating meshes in two and three dimensions is provided. The method involves generating several meshes, each covering a range of frequencies. The method of the present invention broadly comprises the steps of: enclosing a structure to be analyzed in a block of fluid having each of its sides formed by a plurality of equally sized elements; determining a bias factor and coordinates for the mesh; and generating a two dimensional mesh using said coordinates and said bias factor to transition from said equally sized elements to frequency dependent sized elements. After the two dimensional mesh has been created, the method of the present invention goes on to continue the transition by generating a three dimensional mesh using said coordinates.

Other details of the method of the present invention, as well as other objects and advantages attendant thereto, are set forth in the following description and the accompanying drawings wherein like reference numerals depict like elements.

DESCRIPTION OF THE PREFERRED EMBODIMENT(S)

As previously discussed, the present invention is a frequency dependent mesh-generating method for use with finite element solvers having structural acoustic analysis capability. The method may be implemented using any suitable computer known in the art that has been programmed in any suitable language.

Figure 1:
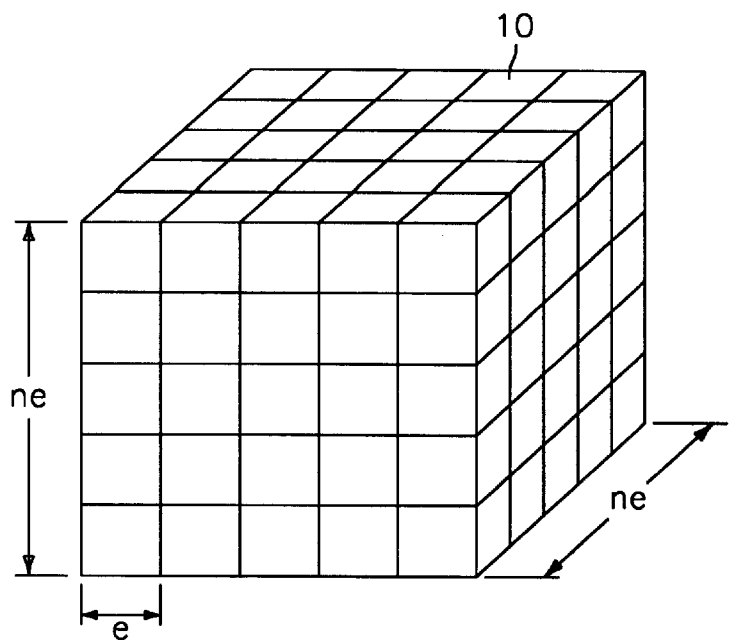
FIG. 1 shows a model of a fluid block surrounding a submerged structure.
Figure 2:
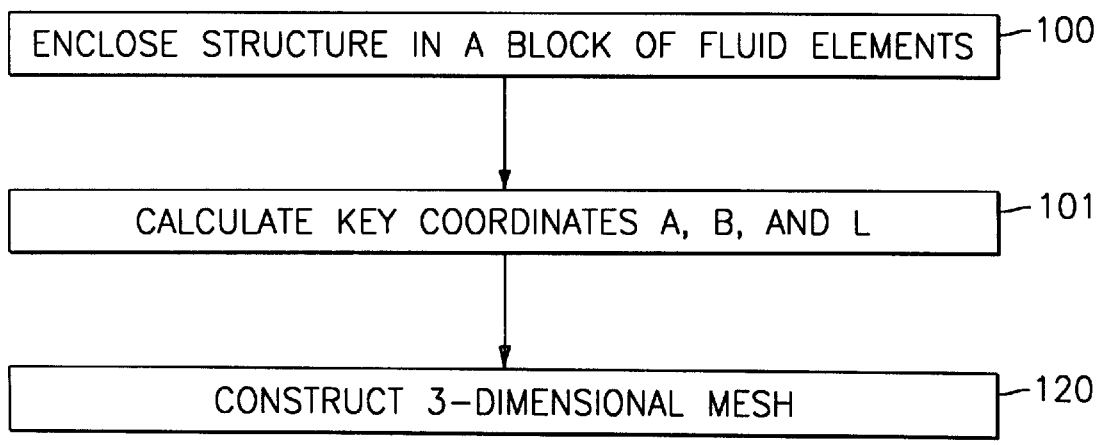
FIG. 2 and 3 show flow charts for performing the method of the present invention.

Referring now to FIGS. 1 and 2, the first step 100 of the method of the present invention is to enclose a three dimensional body (not shown) to be analyzed in a block of fluid, such as water, of equally sized elements. FIG. 1 illustrates a one-eighth symmetry model of a cube shaped block 10 as an example. The element size e should be the same on all sides and is chosen in a manner consistent with well known finite element analysis techniques. The number of elements, n, on each side can be the same or different. The height, width and length of the block 10, as shown in FIG. 1, are ne (n*e).

Figure 4:
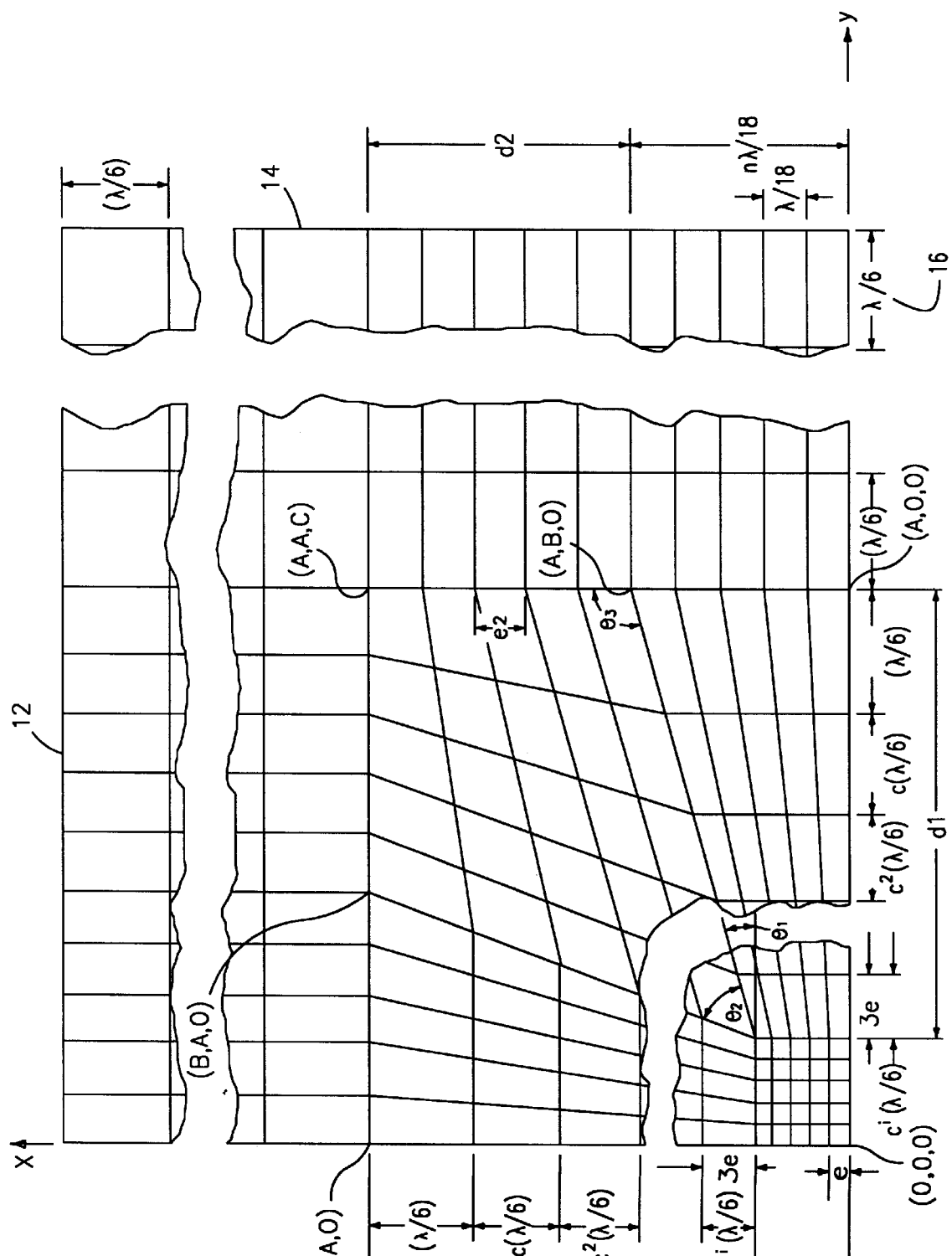
FIG. 4 shows a mapped 2-dimensional mesh generated using the method of the present invention.

As previously mentioned, the frequency range, such as 10 Hz to 500 Hz, for the entire analysis is preferably split into several sub-ranges. The dimensions of a grid or two dimensional mesh are then mapped. As shown in FIG. 4, the two-dimensional mesh includes low frequency boundaries 12 and 14 and a high frequency maximum element length 16, which preferably equals $\lambda/6$, where $\lambda$ is the highest frequency acoustic wavelength. The mesh of FIG. 4 is shown broken to illustrate that the low frequency boundaries 12 and 14 are very distant from the origin (0,0,0). As will be discussed in more detail hereinafter, the mesh elements have varying dimensions, which are expressed in terms of the coordinates A, B, and L and a bias factor c.

The method efficiently maps the nodes necessary to create the frequency dependent mesh, both in two dimensions and in three dimensions, using the following equations:

$$d_1 = \lambda/6 \cos \theta \Sigma c^i, \text{ where the index is summed from 0 to } i \quad (1)$$

$$c = (18/\lambda * e \cos \theta)^{-i} \quad (2)$$

$$\theta = (\sin^{-1}(n\lambda/6 - ne))/(\lambda/6 \Sigma c^i), i = 0, i \quad (3)$$

Figure 3:
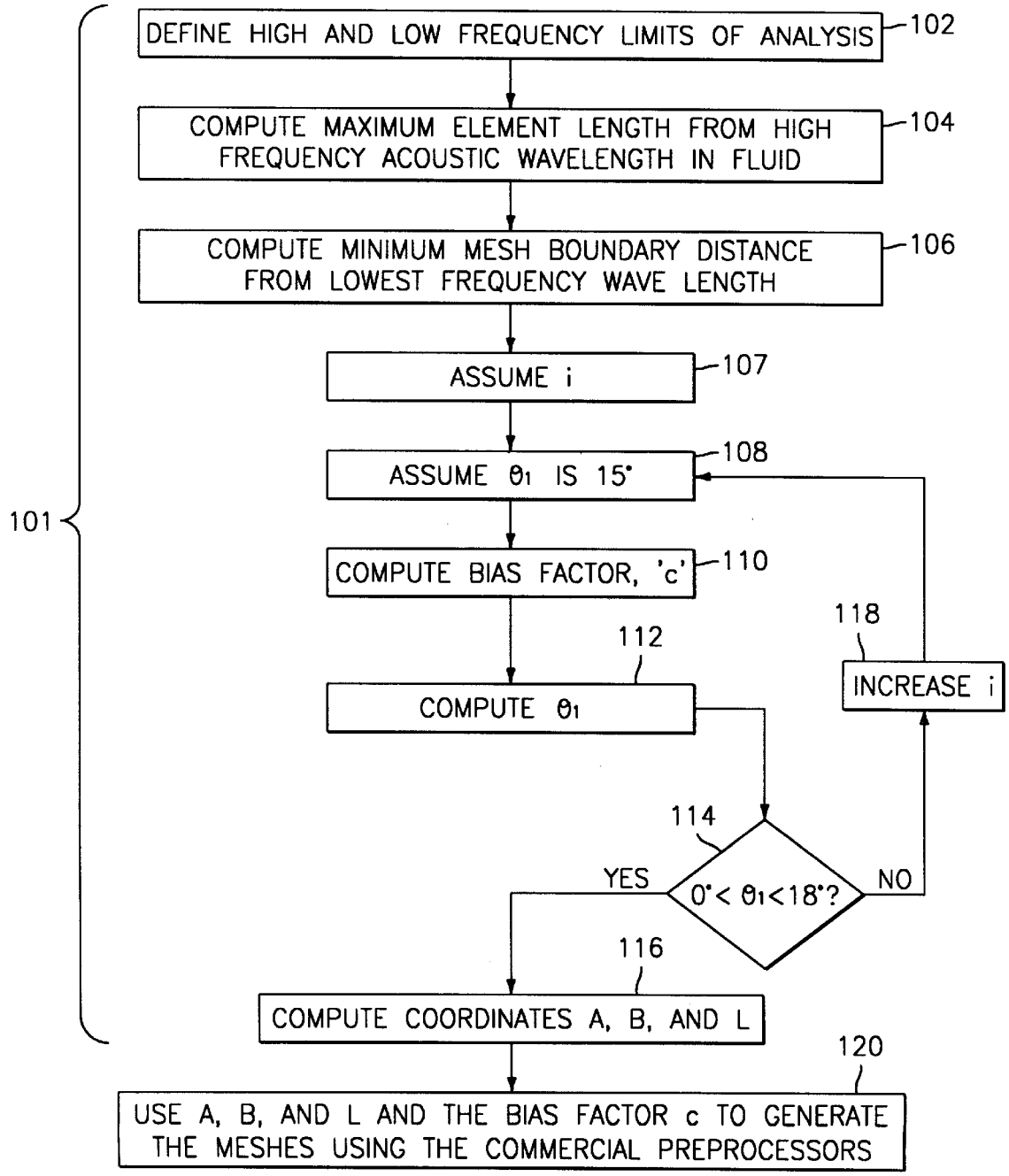
Figure 5:
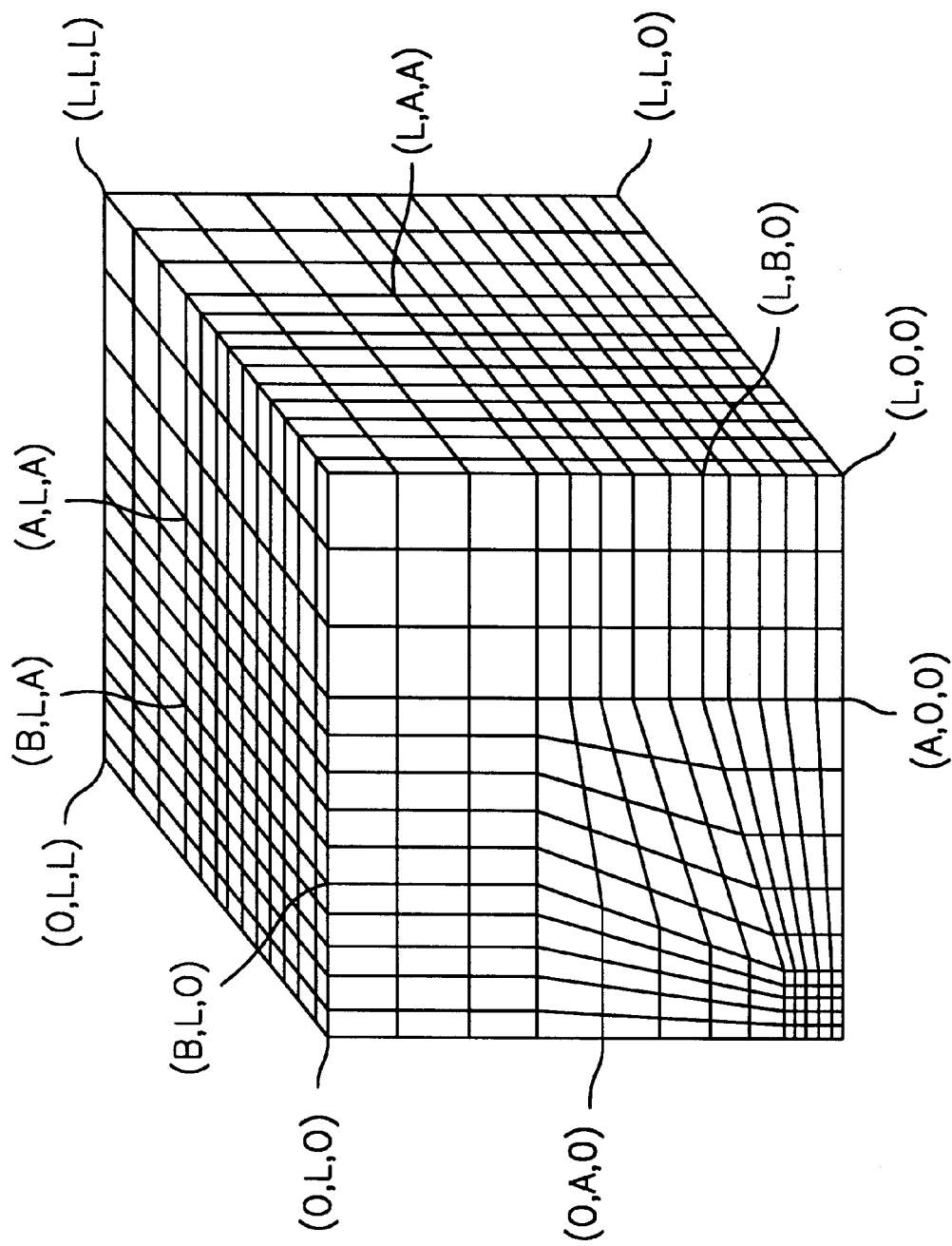
FIG. 5 shows a mapped 3-dimensional mesh generated using the method of the present invention.

In the second step 101 of the method of the present invention, the coordinates A, B and L, which are used to form the two-dimensional mesh of FIG. 4 and the three dimensional mesh of FIG. 5, are calculated. As shown in more detail in FIG. 3, this involves, in step 102, defining the high and low frequency limits, as boundaries 12 and 14, for the analysis. In step 104, the maximum element length 16 from the high frequency acoustic wavelength $\lambda$ in the fluid is calculated. As previously discussed, it has been found that a desirable element length is $\lambda/6$.

In step 106, the minimum mesh boundary distance from the lowest frequency wavelength is determined. The minimum boundary distance for low frequency is $\lambda_L$, where $\lambda_L$ is the acoustic wavelength at the low frequency limit.

In step 107, a first value is chosen for i. The value is chosen to be less than the optimal number of transition elements. A value of i=1 can be used as a starting point if a more suitable starting value cannot be intuitively determined.

$\theta_1$, as used herein, defines the increment in element thickness. See FIG. 4. In step 108, it is assumed that $\theta_1$ is 15°. In step 110, the bias factor c is calculated using equation (2).

In step 112, a new $\theta_1$ is calculated using equation (3). If the new $\theta_1$ is greater than 0° and less than 18°, the method proceeds from step 114 to step 116. If the new $\theta_1$ is outside of this range, then the method proceeds to step 118 where i is increased. Thereafter steps 108, 110, 112 and 114 are repeated. The value of i is preferably iterated until a minimum value is found that results in realistic (nonnegative values) and $\theta_1$ having a value of less than 18°. If $\theta_1$ is greater than 18 degrees, included angle problems may appear later in the method. Note that if the value of i chosen in step 107 is too large, then the number of transition elements will not be a minimum.

In step 116, coordinates A, B, and L are calculated using equations (4)–(6)

$$A = ne + d1 \quad (4)$$

$$B = n\lambda/18 \quad (5)$$

$$L = \lambda_L \quad (6)$$

Having determined the coordinates A, B, and L and the bias factor c, the two and three dimensional meshes, respectively shown in FIGS. 4 and 5, may be generated or constructed using commercial preprocessors in step 120. Acceptable preprocessors include ABAQUS, HYPERMESH and IDEAS. To construct the two dimensional mesh shown in FIG. 4, one first computes the length $d_2$ which is A–B. Then i equally spaced element nodes are mapped along this edge to create element length $e_2$, which is equal to $d_2/i$. For the two- and three-dimensional meshes of FIGS. 4 and 5, i is shown as 5. Therefore, $e_2 = d_2/5$ and five nodes are mapped between coordinates (A,B,O) and (A,A,O) and between coordinates (B,A,O) and (A,A,O). The ratio of $e_2$ to $\lambda/6$ is checked to verify the elements in the remaining area, i.e., the area defined by coordinates $(n_e, n_e)$, (A,B), (A,A) and (B,A) of FIG. 4, have a ratio of 3:1. The length of $e_2$ preferably is in the range of $\lambda/18 \leq e_2 \leq \lambda/6$. The maximum included angles of the elements in the mesh are $\theta_2$ and $\theta_3$, where $\theta_2 = 90 - 2*\theta_1$ and $\theta_3 = 90 + \theta_1$. The mesh of FIG. 4 is checked for appropriate included angles, i.e. $\theta_2 > 45°$ and $\theta_3 < 135°$.

It can be seen from FIG. 4 that n nodes are mapped between coordinates (A,O,O) and (A,B,O). For the mesh of FIG. 4, the block 10 was taken as a cube, therefore, n nodes are also mapped between coordinates (O,A,O) and (B,A,O). The spacing of nodes along the length $d_1$ varies with $c^i$, from a value of $c^i(\lambda/6)$ adjacent block 10 to $c^0$ ($\lambda/6$), or $\lambda/6$, as shown. It is noted that to maintain the 3:1 ratio, $c^i(\lambda/6)$ should be less than or equal to $3e$. To complete the mesh from a distance A to low frequency boundaries 12 and 14, additional nodes are spaced at $\lambda/6$.

If the ratio of $e_2$ to $\lambda/6$ is less than 0.3333, or included angles are not acceptable, then the method is retried with a higher frequency range or a larger value of i. Lower frequencies can be accommodated by copying additional elements in all directions. The element length can be extended in increments of $\lambda/6$ in the x and y directions. After a suitable 2-dimensional mesh is formed, a three dimensional mesh is generated in step 120 by mapping the two dimensional space of FIG. 4 to three dimensions as shown in FIG. 5.

The mapping of fluid meshes to rectilinear coordinates with variable frequency ranges for use with commercial software is novel and unique. The optimization of the transition from a structural length on the order of "e" to a much greater length "$\lambda/6$" also distinguishes the method of the present invention from other methods.

If desired, the method of the present invention may be performed with alterations in the recommended angles for the start of the iteration process and in the number of elements per wavelength. The outer boundary could be further or closer to the structure depending on the desired accuracy of the solution.

The method of the present invention has particular utility in the generation of ABAQUS input meshes.

It is apparent that there has been described in accordance with the present invention a method for generating 2 and 3-dimensional fluid meshes for structural/acoustic finite element analysis in an infinite medium which meets the objects, advantages, and means set forth hereinbefore. While the method of the present invention has been described in the context of specific embodiments thereof, other alternatives, modifications and variations will become apparent to those skilled in the art having read the foregoing description. Therefore, it is intended to embrace all such alternatives, modifications and variations that fall within the broad scope of the appended claims.

What is claimed is:

1. A method for generating a variable frequency mesh for use in a structural/acoustic finite element analysis of a structure comprising the steps of:

enclosing the structure to be analyzed in a block of fluid, and said block of fluid having each of its sides formed by a plurality of equally sized elements;

determining a bias factor and coordinates; and generating at least one of a two dimensional mesh and a three dimensional mesh using said coordinates and said bias factor to transition from said equally sized elements to frequency dependent sized elements.

2. The method according to claim 1 wherein said bias factor and coordinate determining step comprises:
   defining high and low acoustic frequency limits;
   determining a maximum element length for said frequency dependent sized elements using a high frequency acoustic wavelength in the fluid; and
   determining a minimum mesh boundary distance for a side of said at least one mesh from a lowest frequency acoustic wavelength in the fluid.

3. The method according to claim 2 wherein said bias factor and coordinate determining step further comprises:
   assuming an increment in element thickness has a particular angular value; and
   computing said bias factor using the following equation:

$$c = (18/\lambda * e * \cos\theta)^{-i},$$

where
   c=bias factor,
   $\lambda$=wavelength of the highest acoustic frequency,
   e=element size of the equally sized elements,
   $\theta$=increment in element thickness, and
   i=index from 0 to 1.

4. The method according to claim 3 wherein said assuming step comprises assuming said increment in element thickness to be 15 degrees.

5. The method according to claim 3 further comprising computing a new increment in element thickness using the equation:

$$\theta = (\sin^{-1}(n\lambda/6 - ne)) / \left(\lambda/6 \sum_o^i c^i\right),$$

where n=number of elements in a side of the block.

6. The method according to claim 5 further comprising determining whether $\theta$ has a value greater than 0 degrees but less than 18 degrees.

7. The method according to claim 6 further comprising increasing the value of i if $\theta$ has a value of greater than 18 degrees and re-determining the value of the bias factor c and the increment in element thickness $\theta$ for said increased value of i.

8. The method according to claim 6 further comprising determining said coordinates if $\theta$ has a value greater than 0 degrees and less than 18 degrees.

9. The method according to claim 8 wherein said coordinate determining step comprises determining coordinates A, B and L using the following equations:

$$d_1 = \lambda/6\cos\theta \sum_o^i c^i;$$

A=ne+$d_1$;
   B=n$\lambda$/18; and
   L=$\lambda_L$, where $\lambda$ is the wavelength of the lowest acoustic frequency.

10. The method of claim 9 wherein said generating step further comprises determining a length $d_2$ which is A–B, creating an element length $e_2 = d_2/i$, and verifying that the ratio of $e_2$ to $\lambda/6$ has a ratio of 3:1.

11. The method of claim 9 further comprising constructing said three dimensional mesh.

12. The method of claim 1 wherein said generating step comprises transitioning said equally sized elements to said frequency dependent sized elements.

13. The method of claim 12 wherein said transitioning step comprises forming a mesh wherein along each side said equally sized elements are transitioned to elements having a length of $\lambda/6$ where $\lambda$ is the wavelength of a highest frequency acoustic wavelength in the fluid via intermediate sized elements having a dimension equal to $c^i(\lambda/6)$ where c is a bias factor and i is an index number.

* * * * *